Patented Sept. 22, 1931

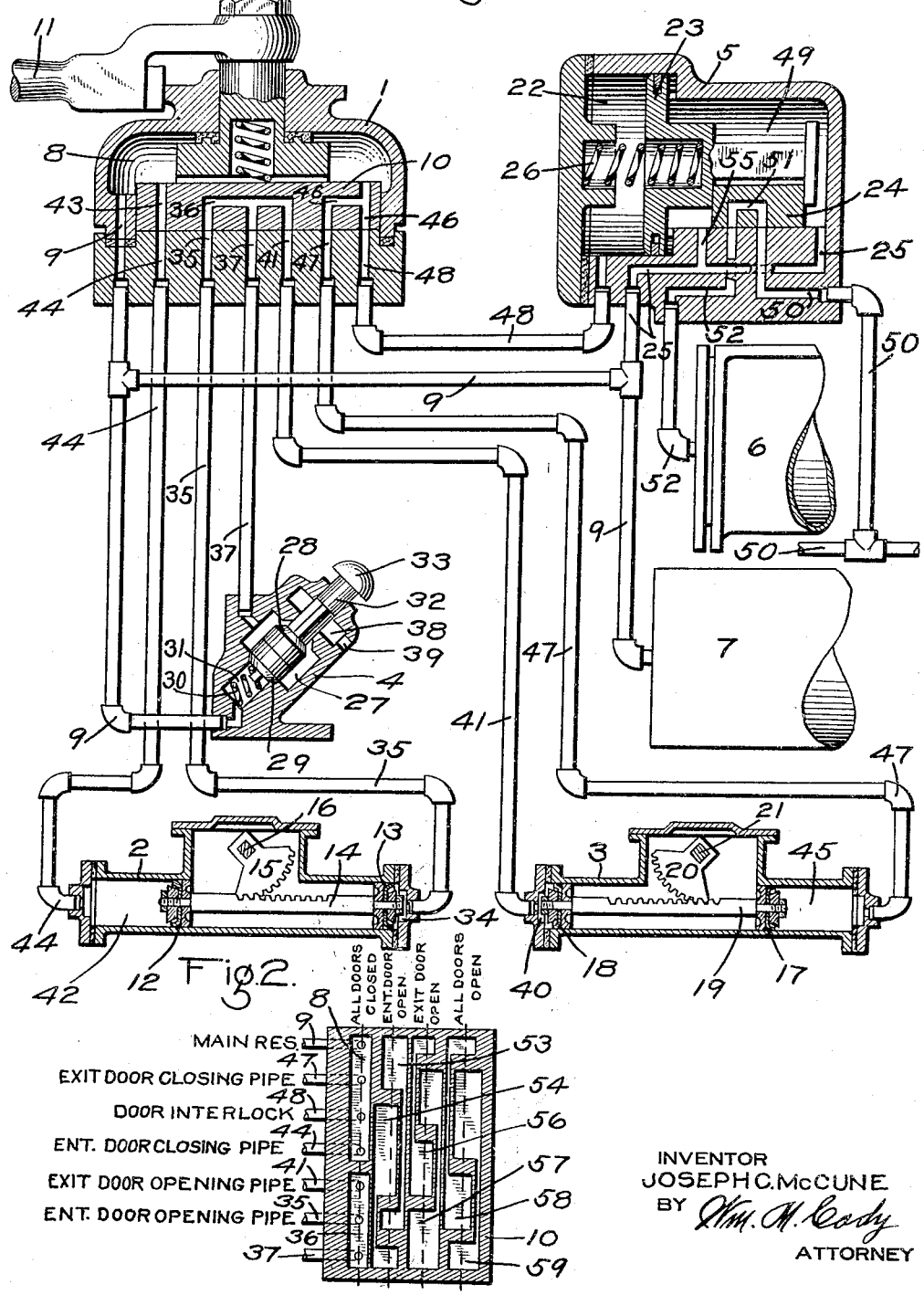

1,824,054

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE AND DOOR INTERLOCK

Application filed April 4, 1929. Serial No. 352,463.

This invention relates to fluid pressure means for controlling the brakes and door or doors of a vehicle.

The principal object of my invention is to so associate the fluid pressure door controlling means and fluid pressure brake equipment of a vehicle that an application of the brakes will be automatically effected upon the opening of the vehicle door or doors while the vehicle is in motion, and further, that the release of the brakes will be prevented if the vehicle is stopped and the operator attempts to put the vehicle in motion while the vehicle door or doors are open.

Another object of my invention is to provide a valve device operative upon the opening of a vehicle door for effecting an application of the vehicle brakes and for preventing the release of the brakes while the vehicle door is open.

A further object of my invention is to provide a valve device which is interposed between the fluid pressure door controlling means and the fluid pressure brake equipment of a vehicle and which, when the vehicle door is closed, establishes communication through which fluid under pressure is supplied and released to and from the brake cylinder and which, when the doors are open, closes said communication so as to prevent the release of fluid under pressure from the brake cylinder and the consequent release of the brakes.

Other objects and advantages will appear in the following more detailed description of my invention.

In the accompanying drawings: Figure 1 is a diagrammatic view, mainly in section, of a door controlling means and a portion of a fluid pressure brake equipment embodying my invention; and Fig. 2 is a diagrammatic development of the rotary valve of the door selector valve device; the rotary valve in both figures being shown in "all doors closed" position.

As shown in the drawings, the brake and door interlock may comprise a door selector valve device 1, an entrance door operating engine 2, an exit door operating engine 3, a foot valve device 4, a door interlock valve device 5, a brake cylinder 6 and a main reservoir 7.

The door selector valve device may comprise a casing having a chamber 8 constantly connected to the main reservoir 7 through a pipe and passage 9 and containing a rotary valve 10 adapted to be operated by a handle 11.

The entrance door engine 2 may comprise a casing containing pistons 12 and 13 which are connected together, in spaced relation to each other, by a rack bar 14, the teeth of which, mesh with the teeth of a segment gear 15, secured to a rotatable door operating shaft 16.

The exit door engine 3 may comprise a casing containing pistons 17 and 18 which are connected together, in spaced relation to each other, by a rack bar 19, the teeth of which, mesh with the teeth of a segment gear 20, secured to a rotatable door operating shaft 21.

The door interlock valve device may comprise a casing having a chamber 22 containing a piston 23 adapted to operate a slide valve 24 contained in a chamber 49 which is constantly connected to the main reservoir 7, through pipe 9 and a branch pipe and passage 25. Also contained in the piston chamber 22 and interposed between one side of the piston 23 and the casing, is a spring 26.

The foot valve device 4 may comprise a casing having a chamber 27 containing double seating valves 28 and 29 which are subject to the pressure of a spring 30 contained in a chamber 31 which is constantly connected to the main reservoir 7, through the pipe 9. The valves 28 and 29 are adapted to be operated by a plunger 32 slidably mounted in the casing and operative manually through the medium of a foot button 33. With the car in motion, the operator maintains the valve 29 seated and the valve 28 unseated through the medium of the plunger 32 and foot button 33.

With the valves 29 and 28 of the foot valve device maintained in the positions just described, and with the door selector valve device in position as shown in Figs. 1 and 2 for closing all of the doors, the piston chamber 34 at the door opening side of the piston 13, of the entrance door engine 2, is vented to the atmosphere by way of a door opening pipe and passage 35, a cavity 36 in the rotary valve 10 of the door selector valve device, a passage and pipe 37, valve chamber 27 in the foot valve device 4, past the unseated valve 28 and fluted end portion of the foot controlled plunger 32, into a chamber 38, and from thence through an atmospheric passage 39. The piston chamber 40 at the door opening side of the piston 18 of the exit door engine 3 is likewise vented to the atmosphere by way of a pipe and passage 41 and cavity 36 in the rotary valve 10.

With the door selector valve device in this position, fluid under pressure is supplied from the main reservoir 7 to the piston chamber 42 at the door closing side of the entrance door closing piston 12, through pipe and passage 9, rotary valve chamber 8 in the door selector valve device, a port 43 in the rotary valve 10 and a passage and pipe 44. From the chamber 8, fluid under pressure is supplied to the piston chamber 45 at the door closing side of the exit door closing piston 17, through a port 46 in the rotary valve 10 and a passage and pipe 47. From the port 46, fluid under pressure is also supplied to the piston chamber 22 in the door interlock valve device 5, through a passage and pipe 48. Since fluid under pressure is thus supplied from the main reservoir 7 to the piston chamber 22 and the valve chamber 49 is constantly connected to the reservoir 7, through passage and pipe 25, and pipe 9, the pressures in these chambers will be substantially equal, and the pressure of the spring will maintain the piston 23 and slide valve 24 in their extreme right hand positions as shown in Fig. 1.

With the slide valve 24 in its right hand position, fluid under pressure may be supplied to or released from the brake cylinder 6, by way of a pipe and passage 50, a cavity 51 in the slide valve 24 and a passage and pipe 52. Fluid under pressure may be supplied to and released from the pipe 50 through the medium of the usual brake valve device, triple valve device or any other desired device.

From the foregoing description it will be seen that both the entrance and exit doors will be maintained closed and the door interlock valve device maintained in the position shown in the drawings, in which, the brakes may be controlled in the usual manner, by supplying or releasing fluid to or from the brake cylinder through pipe 50. With the door selector valve device in "all doors closed" position, the door interlock valve device will not be operated from its right hand position, so that the usual control of the brakes will not be interfered with.

If, when the car is brought to a stop, the operator desires to open the entrance door only, he operates the door selector valve device to "entrance door open" position, in which, fluid under pressure from the rotary valve chamber 8, as supplied from the main reservoir 7, is supplied to the door opening piston chamber 34 in the entrance door engine 2, through a port 53 in the rotary valve 10 and passage and pipe 35, and further, from the port 53, fluid under pressure is also supplied to the door closing piston chamber 45 in the exit door engine 3. At the same time, fluid under pressure is released from the piston chamber 22 in the door interlock valve device 5 to the atmosphere, by way of pipe and passage 48, a cavity 54 in the rotary valve 10, passage and pipe 37, piston chamber 27 in the foot valve device 4, past the unseated valve 28 and fluted portion of the plunger 32, into chamber 38 and from thence through the atmospheric passage 39. The door closing piston chamber 42, in the entrance door engine 2, and the door opening piston chamber 40, in the exit door engine 3, are vented to the atmosphere through pipes 44 and 41, respectively, and through the cavity 54.

With the piston chamber 22 in the door interlock valve device thus vented, fluid at main reservoir pressure, present in the valve chamber 49, causes the piston to operate to its extreme left hand position, against the pressure of spring 26, carrying with it, the slide valve 24, thus closing off communication of the brake cylinder 6 with the pipe 50 and establishing communication through which fluid under pressure flows from the main reservoir 7 to the brake cylinder, through pipe 9, pipe and passage 25, a branch passage 55 in the door interlock valve device, cavity 51 in the slide valve 24 and passage and pipe 52.

With the piston chamber 42, in the entrance door engine 2, vented to the atmosphere and fluid under pressure supplied to the piston chamber 34, in this engine, the pistons 12 and 13 are caused to move toward the left hand, and the rack 14, connecting said pistons, rocks the gear segment 15 to operate the entrance door to open position. Since the chamber 40, in the exit door engine, is vented to the atmosphere and the door closing piston chamber 45 is supplied with fluid under pressure, the exit door will be maintained closed.

If the operator desires to open the exit door and maintain the entrance door closed, he operates the door selector valve device to "exit door open" position, in which, a port 56 in the rotary valve 10 establishes communication through which fluid under pressure is supplied from the main reservoir to the entrance door closing pipe 44 and to the exit door opening pipe 41. At the same time, a cavity 57 in the rotary valve 10 establishes communication through which the piston chamber 22 of the door interlock valve device, exit door closing piston chamber 45 and entrance door opening chamber 34, are vented to the atmosphere, by way of pipe 37 and foot valve device 4. With the piston chamber 22 of the door interlock valve device thus vented, said device will operate, as before described, to close off the communication from the brake cylinder 6 to the pipe 50 and to establish communication from the main reservoir to the brake cylinder. With the door closing piston chamber 45, in the exit door engine 3, vented to the atmosphere, and the piston chamber 40 supplied with fluid under pressure, the engine 3 will operate to open the exit door, the entrance door will be maintained closed, since fluid under pressure is present in the door closing piston chamber 42 of the entrance door engine 2 and the door opening piston chamber 34 is vented to the atmosphere.

If the operator should desire to open all of the doors, he operates the door selector valve device to "all doors open" position, in which, fluid under pressure is supplied to the exit door opening pipe 41 and entrance door opening pipe 35 through a port 58 in the rotary valve 10 and, at the same time, the piston chamber 22 in the door interlock valve device and the door closing piston chambers 42 and 45, in the door engines 2 and 3, respectively, are connected through a cavity 59 in the rotary valve 10, to the pipe 37 leading to the atmosphere by way of the foot valve device 4. With the chamber 22 in the door interlock valve device thus vented, this device will operate to its extreme left hand position as before described. Since the door closing piston chambers 42 and 45 of the door engines 2 and 3, respectively, are vented to the atmosphere, and fluid under pressure is supplied to the respective door opening piston chambers 34 and 40, both door engines will operate to open both doors.

With the door selector valve device in any door open position, the door interlock valve device will be in its extreme position toward the left hand, thus supplying fluid under pressure from the main reservoir 7 to the brake cylinder 6 so as to maintain the brakes applied, thus rendering it practically impossible to start the car while one or more of the doors are open, since the communication from the brake cylinder to the pipe 50 is closed off.

If the operator desires to start the car, he must first move the door selector valve device to "all doors closed" position, in which, fluid under pressure, from the main reservoir 7, will again be supplied to the door closing piston chambers 42 and 45 in the door engines 2 and 3 respectively, and the respective door opening piston chambers 34 and 40 are vented to the atmosphere, thus operating one or both of the door engines, as the case may be, to door closing position. With the door selector valve device in this position, fluid under pressure from the rotary valve chamber 8, as supplied by the main reservoir 7, is supplied to the piston chamber 22 in the door interlock valve device, and when the pressure in this chamber 22 is substantially equal to the pressure of fluid in the valve chamber 49, as supplied by the main reservoir, the pressure of the spring 26 causes the piston 23 to operate and shift the slide valve 24 to its extreme position toward the right hand, thus closing off the communication from the main reservoir to the brake cylinder 6 and again establishing communication from the brake cylinder to the pipe 20 by way of the cavity 51 in the slide valve 24.

With the communication again established between the brake cylinder and the pipe 50, the brakes may be released by venting the pipe 50 or the brakes may be applied by supplying the pipe 50 with fluid under pressure.

If when the car is in motion, the operator should move the door selector valve device to any door open position, the door interlock valve device 5 will operate from its normal running position, as shown in Fig. 1, to its extreme left hand position, in which, fluid under pressure, from the main reservoir, is supplied to the brake cylinder, resulting in a brake application. It will thus be seen that if the door selector valve device is not returned to "all doors closed" position, the car will be brought to a stop, regardless of whether the operator desires to make a stop or not.

To balance the doors in effecting an emergency application of the brakes, the operator relieves the pressure on the foot button 33 of the foot valve 4 and the pressure of the spring 30 causes the valve 29 to unseat and the valve 28 to seat. Upon the seating of the valve 28, communication from the valve chamber 27 to the atmosphere, by way of chamber 38, and passage 39, is closed off, and upon the unseating of the valve 29, fluid under pressure from the main reservoir 7 flows through pipe 9, chamber 30 in the foot valve device 4, past the open valve 29, into valve chamber 27 and from thence, through pipe and passage 37 and cavity 36 in the rotary valve 10 to the door opening piston chambers 34 and 40 in the door engines 2 and 3, respectively, and since the respective door closing chambers 42 and 45 are supplied with fluid under pressure by the main reservoir, the engines will not operate to open the doors, but will permit them to be opened manually.

Should the operator be incapacitated and relieve the pressure on the foot button 33 of the foot valve device 4, the doors will be balanced as just described, the application of the brakes, in such cases, being automatically effected in the usual manner by mechanism which has been omitted from the drawings, since such mechanism forms no part of this invention.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a brake cylinder, of means for establishing communication through which fluid under pressure is adapted to be supplied and released to and from the brake cylinder, means for controlling the opening and closing of a vehicle door, the first mentioned means being operative to close said communication when the second mentioned means is operated to open said door.

2. In a fluid pressure brake and door controlling equipment for a vehicle, the combination with a brake cylinder, of a valve device normally establishing communication through which fluid under pressure is supplied and released to and from the brake cylinder and being operative to close said communication, a fluid pressure operated door engine for controlling the opening and closing of a door of the vehicle, and a valve device operative to control the operation of said engine and to control the operation of said valve device.

3. In a fluid pressure brake and door controlling equipment for a vehicle, the combination with a brake cylinder, of a valve device normally establishing communication through which fluid under pressure is supplied and released to and from the brake cylinder, a door engine for opening and closing said door, and means having a door open position for controlling the operation of said door engine to open said door and for controlling the operation of said valve device to close said communication.

4. In a fluid pressure brake and door controlling equipment for a vehicle, the combination with a brake cylinder, of a valve device normally establishing communication through which fluid under pressure is supplied and released to and from the brake cylinder, a door engine for opening and closing said door, and means having a door open position for controlling the operation of said door engine to open said door and for controlling the operation of said valve device to close said communication, said means also having a position for controlling the operation of said door engine to close the door and for controlling the operation of said valve device to again establish said communication.

5. In a fluid pressure brake and door controlling equipment for a vehicle, the combination with a brake cylinder, of a valve device normally establishing communication through which fluid under pressure is supplied and released to and from the brake cylinder, a door engine for opening and closing said door, and means having a door open position for controlling the operation of said door engine to open said door and for controlling the operation of said valve device to close said communication, said means also having a position for controlling the operation of said door engine to close the door and for controlling the operation of said valve device to again establish said communication and to establish another communication through which fluid under pressure is supplied to the brake cylinder.

6. In a fluid pressure brake and door controlling equipment for a vehicle, the combination with a brake cylinder, of a valve device normally establishing communication through which fluid under pressure is supplied and released to and from the brake cylinder, a door engine for opening and closing said door, and means having a door open position for controlling the operation of said door engine to open said door and for controlling the operation of said valve device to close said communication, said means also having a position for controlling the operation of said door engine to close the door and for controlling the operation of said valve device to again establish said communication and to establish another communication through which fluid under pressure is supplied to the brake cylinder, said means having another position for controlling the operation of said door engine to close the door and for controlling the operation of said valve device to close the last mentioned communication and reestablishing the first mentioned communication.

7. In a fluid pressure brake and door controlling equipment for a vehicle, the combination with a reservoir normally charged with fluid under pressure and a brake cylinder of a valve device having piston means subject on one side to the pressure of fluid from said reservoir and subject on the other side to the pressure of fluid from said reservoir and the pressure of a spring for establishing communication through which fluid under pressure is adapted to be supplied and released to and from the brake cylinder and operative upon a reduction in the pressure of fluid on one side for closing said communication and for establishing another communication through which fluid under pressure is supplied from said reservoir to the brake cylinder, fluid pressure operated means for opening and closing a door of the vehicle, and means for simultaneously controlling the operation of said valve device and door operating means.

8. In a fluid pressure brake and door controlling equipment for a vehicle, the combination with a reservoir normally charged with fluid under pressure and a brake cylinder of a valve device having piston means subject on one side to the pressure of fluid from said reservoir and subject on the other side to the pressure of fluid from said reservoir and the pressure of a spring for establishing communication through which fluid under pressure is adapted to be supplied and released to and from the brake cylinder and operative upon a reduction in the pressure of fluid on one side for closing said communication and for establishing another communication through which fluid under pressure is supplied from said reservoir to the brake cylinder, means for operating a door of the vehicle to open position, and means for controlling the operation of the door operating means and for reducing the pressure of fluid on one side of said piston means.

9. In a fluid pressure brake and door controlling equipment for a vehicle, the combination with a reservoir normally charged with fluid under pressure and a brake cylinder of a valve device having piston means subject on one side to the pressure of fluid from said reservoir and subject on the other side to the pressure of fluid from said reservoir and the pressure of a spring for establishing communication through which fluid under pressure is adapted to be supplied and released to and from the brake cylinder and operative upon a reduction in the pressure of fluid on one side for closing said communication and for establishing another communication through which fluid under pressure is supplied from said reservoir to the brake cylinder, means for operating a door of the vehicle to open position, and manually operative valve means for controlling the operation of the door operating means and for reducing the pressure of fluid on one side of said piston means.

10. The combination with a brake cylinder, of valve means for establishing communication through which fluid under pressure is adapted to be supplied to and released from the brake cylinder, fluid pressure controlled means operative to control the opening and closing of a vehicle door, said valve means being operative to close said communication when said fluid pressure controlled means is operated to open said door.

11. The combination with a brake cylinder, of valve means for establishing communication through which fluid under pressure is adapted to be supplied to and released from the brake cylinder, fluid pressure controlled means operative to control the opening and closing of a vehicle door, and a valve device operative to control the operation of said fluid pressure controlled means to open said door and to control the operation of said valve means to close said communication.

In testimony whereof I have hereunto set my hand, this 1st day of April, 1929.
JOSEPH C. McCUNE.